(12) United States Patent
Oltmann et al.

(10) Patent No.: US 12,115,985 B2
(45) Date of Patent: Oct. 15, 2024

(54) METHOD FOR OPERATING A VEHICLE IN AN AUTOMATED DRIVING OPERATION

(71) Applicant: MERCEDES-BENZ GROUP AG, Stuttgart (DE)

(72) Inventors: Volker Oltmann, Calw (DE); Nikolai Tochtermann, Leonberg (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 18/570,169

(22) PCT Filed: Apr. 27, 2022

(86) PCT No.: PCT/EP2022/061194
§ 371 (c)(1),
(2) Date: Dec. 14, 2023

(87) PCT Pub. No.: WO2022/263044
PCT Pub. Date: Dec. 22, 2022

(65) Prior Publication Data
US 2024/0270244 A1    Aug. 15, 2024

(30) Foreign Application Priority Data
Jun. 15, 2021  (DE) ..................... 10 2021 003 069.9

(51) Int. Cl.
*B60W 30/12*        (2020.01)
*B60W 50/029*       (2012.01)
*B60W 60/00*        (2020.01)

(52) U.S. Cl.
CPC .......... *B60W 30/12* (2013.01); *B60W 50/029* (2013.01); *B60W 60/00186* (2020.02); *B60W 2520/10* (2013.01); *B60W 2552/53* (2020.02)

(58) Field of Classification Search
CPC ............. B60W 50/02; B60W 50/0205; B60W 50/0225; B60W 50/023; B60W 50/029;
(Continued)

(56) References Cited

U.S. PATENT DOCUMENTS 9,927,810 B1 *  3/2018  Laur ................... B62D 15/0285
11,608,080 B2    3/2023  Oltmann et al.
(Continued)

FOREIGN PATENT DOCUMENTS

| CN | 111479741 A | 7/2020 |
| CN | 112166060 A | 1/2021 |

(Continued)

OTHER PUBLICATIONS

International Search Report and Written Opinion mailed Sep. 30, 2022 in related/corresponding International Application No. PCT/EP2022/061194.
(Continued)

*Primary Examiner* — Anshul Sood
(74) *Attorney, Agent, or Firm* — PATENT PORTFOLIO BUILDERS PLLC

(57) ABSTRACT

In a regular mode of automated driving operation a vehicle is guided to a target position by a main control device and in an emergency mode the vehicle is guided along an intended emergency trajectory into a safe stopping position by an auxiliary control device. The intended emergency trajectory is continuously determined by the main control device in the regular mode and is stored in the auxiliary control device, with a lane course of a lane lying ahead of the vehicle. In the emergency mode, the stored intended emergency operation trajectory is corrected based on the stored lane course and a lane course of the lane of the vehicle continuously determined in the emergency mode. The correction is only undertaken if the continuously determined
(Continued)

lane course has previously been evaluated as plausible, the plausibility being checked based on a determined deviation between the stored lane course and the continuously determined lane course.

9 Claims, 1 Drawing Sheet

(58) Field of Classification Search
CPC ....... B60W 60/0018; B60W 60/00186; B60W 2050/0292; B60W 2050/0297
See application file for complete search history.

(56) References Cited

U.S. PATENT DOCUMENTS

| | | | |
|---|---|---|---|
| 11,945,470 | B2 | 4/2024 | Oltmann et al. |
| 2016/0368491 | A1* | 12/2016 | Hauler ................. B60T 7/22 |
| 2017/0010618 | A1* | 1/2017 | Shashua ............... B60W 30/18 |
| 2021/0107520 | A1* | 4/2021 | Oltmann ............. B60W 60/0015 |
| 2021/0197864 | A1 | 7/2021 | Oltmann et al. |

FOREIGN PATENT DOCUMENTS

| | | |
|---|---|---|
| DE | 102013003216 A1 | 9/2013 |
| DE | 102013213171 A1 | 1/2015 |
| DE | 102014200638 A1 | 7/2015 |
| DE | 102015003124 A1 | 9/2016 |
| DE | 102017011808 A1 | 6/2019 |
| DE | 102018004303 B3 | 11/2019 |
| DE | 102019102830 A1 | 8/2020 |
| EP | 2390862 A2 | 11/2011 |

OTHER PUBLICATIONS

Office Action created Jan. 24, 2022 in related/corresponding DE Application No. 10 2021 003 069.9.
Office Action dated Apr. 30, 2024 in related/corresponding CN Application No. 2022800391760.

* cited by examiner

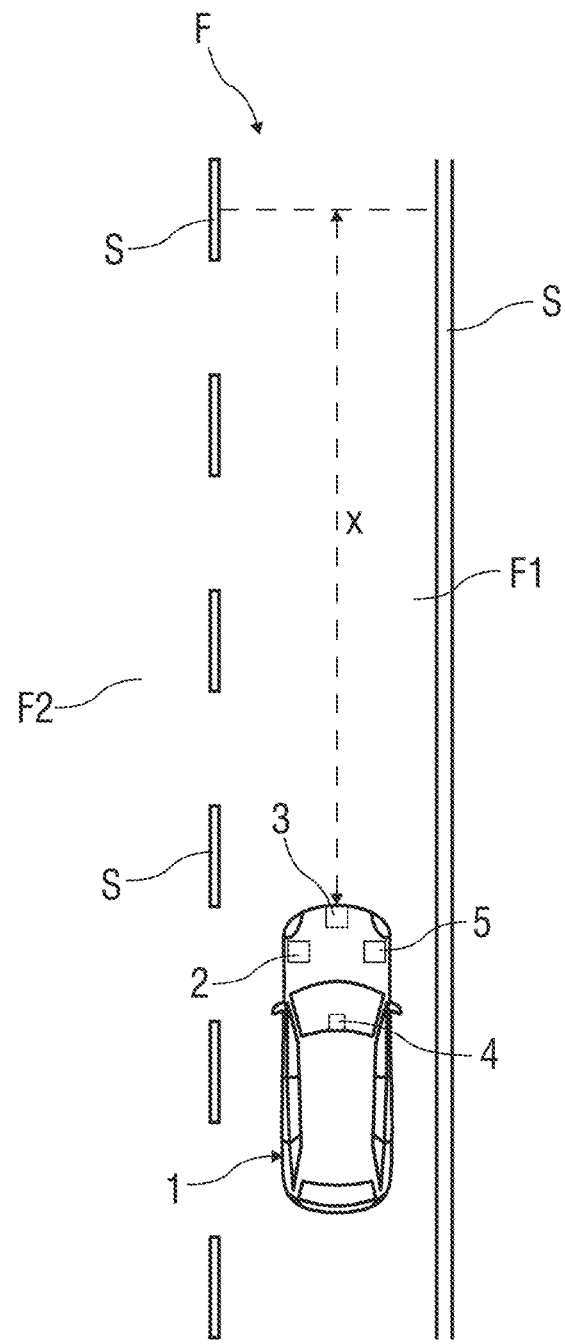

METHOD FOR OPERATING A VEHICLE IN AN AUTOMATED DRIVING OPERATION

BACKGROUND AND SUMMARY OF THE INVENTION

Exemplary embodiments of the invention relate to a method for operating a vehicle in an automated driving operation.

A method for regulating the movement of a vehicle in an automated driving operation and a device for carrying out the method are known from DE 10 2017 011 808 A1. The method provides that the automated driving operation can be switched from a regular operating mode in which the vehicle is guided in an automated manner to a pre-determined target position to an emergency operating mode in which the vehicle is guided in an automated manner to an emergency stopping position. The regulation is carried out by a main control device in the regular operating mode and by an auxiliary control device in the emergency operating mode. The automated driving operation is switched from the regular operating mode to the emergency operating mode if it is determined that the functionality of the main control device is impaired in the regular operating mode. The regulation is carried out in the regular operating mode on the basis of a regular intended trajectory which leads to a target position and is continuously determined by the main control device in the regular operating mode. The regulation in the emergency operating mode is carried out based on an intended emergency operation trajectory stored in the auxiliary control device and leading to the emergency stopping position, the intended emergency operation trajectory having been determined by the main control device in the regular operating mode before the operating mode was switched into the emergency operating mode and having been fed to the auxiliary control device for storage. In the regular operating mode, in addition to the intended emergency operation trajectory, a lane course, associated with the intended emergency operation trajectory, of a lane being driven in by the vehicle is also determined and fed to the auxiliary control device for storage. In addition, it is provided that the intended emergency operation trajectory and the associated lane course are determined in a vehicle-fixed coordinate system of the main control device. In the emergency operating mode, the lane course of the lane driven in by the vehicle is determined in a vehicle-fixed coordinate system of the auxiliary control device, and in the emergency operating mode, a deviation between the coordinate systems of the main control device and of the auxiliary control device is compensated for based on the lane course of the lane stored in the auxiliary control device and the lane course of the lane determined by the auxiliary control device, and the stored intended emergency operation trajectory is thus corrected.

Exemplary embodiments of the invention are directed to a method for operating a vehicle in the automated driving operation.

A method for operating a vehicle in an automated, in particular highly automated or driverless driving operation provides that in a regular operating mode of the automated driving operation, the vehicle is guided in an automated manner to a target position by means of a main control device, and in an emergency operating mode of the automated driving operation, the vehicle is guided in an automated manner along an intended emergency operation trajectory into a safe stopping position by means of an auxiliary control device, wherein the intended emergency operation trajectory is continuously determined by means of the main control device in the regular operating mode and is stored in the auxiliary control device together with a lane course, lying ahead, of a lane of the vehicle which is continuously recorded using lane markings, and in the emergency operating mode, the stored intended emergency operating trajectory is corrected based on the stored lane course and a lane course of the lane of the vehicle which is continuously determined in the emergency operating mode. According to the invention, it is provided that in the emergency operating mode, a deviation between the stored lane course and the lane course that is continuously determined in the emergency operating mode is determined, and that depending on the determined deviation, it is evaluated whether the continuously determined lane course is plausible, and that the stored intended emergency operation trajectory is only corrected based on the stored lane course and the continuously determined lane course if the continuously determined lane course has been evaluated as plausible. The lane course that is continuously determined in the emergency operating mode corresponds to the lane course respectively currently determined in the emergency operating mode.

Depending on the determined deviation, it is thus decided in the emergency operating mode whether the continuously determined lane course, and thus the currently determined lane course, should be taken into account or should continue to be disregarded or should be discarded when the vehicle is being guided into the safe stopping position.

By applying the method, in particular by correcting the stored intended emergency trajectory based on the plausibility check of the continuously determined lane course, the risk can be reduced, if a lane of the vehicle is incorrectly recorded, of using the lane when guiding the vehicle. If the lane course is implausible, the comparatively reliable intended emergency operation trajectory can then be followed by means of so-called dead reckoning data.

One embodiment of the method provides that in the emergency operating mode, the continuously determined lane course is evaluated as plausible if the determined deviation falls short of a pre-determined value. Otherwise, if the continuously determined lane course exceeds the pre-determined value, the lane course is evaluated as implausible and discarded, and the vehicle is then guided into the safe stopping position according to the stored intended emergency trajectory.

In particular, the method is applicable if camera lane information in comparatively complex scenarios delivers incorrect results, which can be identified by means of the method and thus avoided.

The risk of the vehicle leaving the lane and a thus increased risk of accident, not only for the vehicle, in particular due to erroneously recorded lane markings, can further be substantially reduced by means of the method.

In addition, the method can be used to perform a plausibility check of environment recording data of an environment sensor system in a main control device for the automated driving operation of the vehicle.

In a development of the method, the deviation between the stored lane course and the continuously determined lane course is determined by determining what deviation results between the stored lane course and the continuously determined lane course at a pre-determined spacing in front of the vehicle. It is thus possible to easily determine an amount for the deviation.

In a possible development, the pre-determined spacing is pre-determined depending on speed, wherein the spacing selected is larger at a higher speed than at a comparatively low driving speed. It is thus possible to react to any erroneously recorded lane markings in a manner adapted to the speed.

A possible embodiment of the method provides that the stored intended emergency operation trajectory is corrected by comparing the stored lane course with the continuously determined lane course.

Preferably, in order to compare the stored lane course with the continuously determined lane course, it is determined which coordinate transformation should be applied to the stored lane course to align the stored lane course with the continuously determined lane course. It is thus determined to what extent the stored lane course, and thus its coordinate system, needs to be rotated and shifted in order for the stored lane course and the continuously determined lane course to match.

In order to correct the stored intended emergency trajectory, the determined coordinate transformation is applied to the stored intended emergency trajectory. The result of this coordinate transformation is the corrected intended emergency trajectory.

In a further possible embodiment of the method, the vehicle is located in the emergency operating mode by means of dead reckoning if lane markings that are required to determine the lane course are not recorded or if the lane course is recorded but is evaluated as implausible. In particular, the locating is implemented using dead reckoning data which is used to operate the vehicle in the emergency operating mode, such that the vehicle can be moved into the safe stopping position.

In a further possible embodiment, the lane markings are continuously determined using image data, in particular of a vehicle camera and/or of another suitable device, in order to move the vehicle in the activated emergency operating mode into the safe parking position.

Exemplary embodiments of the invention are explained in more detail in the following with reference to a drawing.

BRIEF DESCRIPTION OF THE DRAWING FIGURE

Here:
The sole FIGURE schematically shows a vehicle driving in the automated driving operation in a lane of a road portion.

DETAILED DESCRIPTION

The sole FIGURE shows a road portion F having two lanes F1, F2 of traffic moving in opposite directions and a vehicle 1 driving in the automated driving operation in a right lane F1.

In a regular operating mode of the automated, in particular highly automated driving operation, the vehicle 1 is located with the support of satellites and landmarks by means of a main control device 2. The main control device 2 determines, at regular chronological intervals, an intended trajectory, which represents a driving instruction, in a vehicle-fixed coordinate system and performs a trajectory regulation corresponding to the determined intended trajectory. The intended trajectory comprises a description of a path, along which the vehicle 1 should be moved in the regular operating mode. The intended trajectory additionally comprises a description of a course of a speed at which the vehicle 1 should move along the path.

The vehicle 1 comprises an environment sensor system 3, which has a vehicle camera 4 and lidar-based, radar-based, and/or ultrasound-based recording units (not depicted in detail). Using image data recorded by the vehicle camera 4 and using signals recorded by the recording units, an environment of the vehicle 1 and objects located in the latter are detected.

Using the recorded image data and the recorded signals of the environment sensor system 3, an environment situation is thus detected, including a lane course of the lane F1 of the vehicle 1, and thus the lane course of the right lane F1. The lane course is determined by recording lane markings S which delimit the lane F1.

The intended trajectory, along which the vehicle 1 moves in the regular operating mode of the automated driving operation, is determined using the recorded environment situation, taking into account the recorded lane course and taking into account lane information determined using a digital map.

Simultaneously, during the determination of the intended trajectory, an intended emergency operation trajectory is determined at regular chronological intervals, the intended emergency operation trajectory also being created using the environment situation detected by means of the recorded image data taking into account the recorded lane course taking into account lane information from the digital map in the vehicle-fixed coordinate system.

The intended emergency operation trajectory comprises a description of an emergency path, along which the vehicle 1 is moved in case of a failure of the main control device 2 and/or another error in the vehicle, for example a failure of recording units of the environment sensor system 3, in the activated emergency operating mode into a safe stopping position, which is also described as a safe standstill position. This safe stopping position is for example located at the lane edge of the right lane F1 or on a hard shoulder which is present in some instances.

In addition, the intended emergency operation trajectory comprises a description of a course of a speed or acceleration, with which the vehicle 1 should be guided along the emergency path into the stopping position, and thus into the standstill.

The intended emergency operating trajectory is thus a dataset, which contains a description of the emergency path on which the vehicle should be moved and contains a description of the dynamics with which the vehicle should be moved along the emergency path.

The intended emergency operation trajectory determined at regular chronological intervals, and the lane course determined in the process, in particular the determined lane markings S, are fed to an auxiliary control device 5, for example to a control device of a device for driving dynamics regulation, and stored there for later use in the emergency operating mode. In the auxiliary control device 5, there is thus a description of a course of the emergency path relative to the lane markings S, whereby data of the intended emergency operation trajectory and of the lane course are updated by regularly determining and storing the intended emergency operation trajectory and the lane course.

This auxiliary control device 5 as a back-up to the main control device 2 comprises only a limited number of recording units for transverse vehicle guidance in the emergency operating mode. In the highly automated driving operation, image data recorded by the vehicle camera 4 with lane recognition and dead reckoning data are available to the auxiliary control device 5. Lane information determined by means of the image data, in particular the lane markings S delimiting the right lane F1, are usually correct, wherein the image data can deliver incorrect results in relation to the lane markings S in comparatively complex scenarios.

In order to be able to identify and correct such incorrect results, a method described in the following is provided.

In the event of a failure of the main control device 2 and/or another error limiting the regular operating mode of the automated driving operation, a switch is made from the regular operating mode into the emergency operating mode.

In the event of a switch into the emergency operating mode, the auxiliary control device 5 takes over the control of the vehicle 1 and guides the vehicle into the safe stopping position through trajectory regulation on the basis of the stored intended emergency operation trajectory.

In the emergency operating mode, the lane markings S are continuously determined using the image data recorded by the vehicle camera 4 in order to continuously determine the lane course of the lane F1. The continuously determined lane course, i.e., the currently determined lane course, is compared with the stored lane course. In particular, a deviation between a coordinate system of the stored lane course and a coordinate system of the determined lane markings S is determined and corrected.

The correction is implemented by the coordinate system of the stored lane course being rotated and shifted until the stored lane course matches the currently determined lane course. By means of a correction of the coordinates carried out in this manner, a course of the emergency path is also corrected.

In particular, a spacing x is pre-determined in order to determine the deviation between the stored and currently determined lane course, such that the deviation of the stored lane course from the currently determined lane course is determined at a position at the pre-determined spacing x in front of the vehicle 1. The spacing x is, in particular, pre-determined depending on speed, wherein the spacing x is greater at a higher speed of the vehicle 1 than at a lower speed.

At the spacing x from the vehicle 1, it is determined in front of the vehicle 1 how large the deviation between the stored lane course and the currently determined lane course is.

If, in a next step of the method, it is determined that this deviation falls short of a pre-determined value in meters, the currently determined lane course is evaluated as plausible and used to correct the stored intended emergency trajectory, and the trajectory regulation is carried out according to the corrected intended emergency operation trajectory.

If, however, it is determined that the deviation between the stored lane course and the currently determined lane course exceeds the pre-determined value in meters, then the currently determined lane course is evaluated as implausible, and the intended emergency operation trajectory is not corrected. The stored intended emergency trajectory is then used, unchanged, as the basis for the trajectory regulation.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the FIGURES enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for operating a vehicle in an automated driving operation, the method comprising:
operating the vehicle in a regular operating mode of the automated driving operation in which the vehicle is guided in an automated manner to a target position by a main control device, wherein in the regular operating mode an intended emergency operation trajectory is continuously determined by the main control device and the intended emergency operation trajectory is stored in an auxiliary control device together with a lane course lying ahead of a lane of the vehicle which is continuously recorded by lane markings; and
switching the vehicle from operation in the regular operating mode to operation in an emergency operation mode, wherein in the emergency operating mode the vehicle is guided in an automated manner along the intended emergency operation trajectory into a safe stopping position by the auxiliary control device,
wherein, in the emergency operating mode:
a lane course of the lane of the vehicle that is continuously determined in the emergency operating mode,
a deviation between the stored lane course and the continuously determined lane course is determined,
depending on the determined deviation, it is evaluated whether the continuously determined lane course is plausible, and
the stored intended emergency operation trajectory is only corrected based on the stored lane course and the continuously determined lane course if the continuously determined lane course has been evaluated as plausible.

2. The method of claim 1, wherein in the emergency operating mode, the continuously determined lane course is evaluated as plausible if the determined deviation is below a predetermined value.

3. The method of claim 1, wherein the determined deviation is a deviation between the stored lane course and the continuously determined lane course resulting at a pre-determined spacing in front of the vehicle.

4. The method of claim 3, wherein the spacing is pre-determined depending on speed of the vehicle.

5. The method of claim 1, wherein the stored intended emergency operation trajectory is corrected by comparing the stored lane course with the continuously determined lane course.

6. The method of claim 5, wherein, to compare the stored lane course with the continuously determined lane course, it is determined which coordinate transformation should be applied to the stored lane course to align the stored lane course with the continuously determined lane course.

7. The method of claim 6, wherein if the continuously determined lane course has been evaluated as plausible, the determined coordinate transformation is applied to the stored intended emergency operation trajectory to correct the stored intended emergency operation trajectory.

8. The method of claim 1, wherein in the emergency operating mode, the vehicle is located by dead reckoning if lane markings for determining the lane course are not recorded in the emergency operation mode or if the continuously determined lane course in the emergency operation mode has been evaluated as implausible.

9. The method of claim 1, wherein the lane markings are continuously determined using image data.

* * * * *